(12) United States Patent
Droke

(10) Patent No.: US 11,959,572 B2
(45) Date of Patent: *Apr. 16, 2024

(54) PIPE UNION ASSEMBLY

(71) Applicant: David Droke, Elk City, OK (US)

(72) Inventor: David Droke, Elk City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,852

(22) Filed: Mar. 8, 2023

(65) Prior Publication Data

US 2023/0220934 A1 Jul. 13, 2023

Related U.S. Application Data

(63) Continuation of application No. 17/957,254, filed on Sep. 30, 2022.

(60) Provisional application No. 63/250,733, filed on Sep. 30, 2021.

(51) Int. Cl.
| | |
|---|---|
| *F16L 37/084* | (2006.01) |
| *F16L 19/00* | (2006.01) |
| *F16L 19/02* | (2006.01) |
| *F16L 19/025* | (2006.01) |

(52) U.S. Cl.
CPC ......... *F16L 37/0842* (2013.01); *F16L 19/005* (2013.01); *F16L 19/0212* (2013.01); *F16L 19/025* (2013.01)

(58) Field of Classification Search
CPC ... F16L 19/005; F16L 19/0212; F16L 19/025; F16L 37/0842
USPC .................................................. 285/92, 354
See application file for complete search history.

(56) References Cited

U.S. PATENT DOCUMENTS

| | | |
|---|---|---|
| 5,120,085 A | 6/1992 | Shin |
| 7,350,832 B1 | 4/2008 | Kiely |
| 2014/0374122 A1 | 12/2014 | Fanguy |
| 2017/0152978 A1 | 6/2017 | Leeth |
| 2018/0238477 A1 | 8/2018 | Gauss |
| 2018/0356015 A1 | 12/2018 | Jahnke |
| 2019/0024829 A1 | 1/2019 | Potier |
| 2021/0190242 A1 | 6/2021 | Westgarth |
| 2021/0301953 A1 | 9/2021 | Crawford |

*Primary Examiner* — Zachary T Dragicevich
(74) *Attorney, Agent, or Firm* — Hall Estill Law Firm

(57) ABSTRACT

A pipe union assembly that includes a female end of a first pipe section and a male end of a second pipe section. The pipe union assembly also includes a quick union nut securable to the female end, a retainer collar securable to the quick union nut and a segmented load ring disposed between the male end of the second pipe section and the quick union nut. The quick union nut, the retainer collar and the segmented load ring cooperate to maintain the male end of the second pipe section inside the female end of the first pipe section. A method of using the pipe union assembly to join a first pipe section and a second pipe section.

14 Claims, 4 Drawing Sheets

PIPE UNION ASSEMBLY

CROSS-REFERENCE TO RELATED APPLICATIONS

The present application is a continuation application of U.S. patent application Ser. No. 17/957,254, filed Sep. 30, 2022, which is a conversion of U.S. Provisional Application having U.S. Ser. No. 63/250,733, filed Sep. 30, 2021, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a pipe union assembly for more efficient joinder of two sections of pipe.

2. Description of the Related Art

Frac operations for oil and gas wells requires the handling of fluids at extremely high pressures and flow rates, which requires large ID pipes and pipe junction assemblies. Typically, the pipe junctions include numerous large locking bolts that extend through flanges extending from the pipes. The flanges and the numerous bolts are very large and take up considerable space on the trucks that haul them. Further, numerous bolts needed for each pipe junction requires a considerable amount of time to join two sections of pipe together. The use of the flanges and numerous locking bolts takes a considerable amount of time to assemble and disassemble a pipe junction or pipe junctions. The current pipe junctions for large ID pipes require welding and stress relieving to make repairs.

Accordingly, there is a need for a pipe union assembly that permits more efficient joinder of sections of pipe, allows for repairs to be made without the need for welding and stress relieving, and does not require as many parts, which reduces the weight of the materials for each pipe junction and allows for more space on the trucks.

SUMMARY OF THE DISCLOSURE

The present disclosure is directed to a pipe union assembly. The pipe union assembly includes a female end of a first pipe section and a male end of a second pipe section. The pipe union assembly also includes a quick union nut securable to the female end, a retainer collar securable to the quick union nut and a segmented load ring disposed between the male end of the second pipe section and the quick union nut. The quick union nut, the retainer collar and the segmented load ring cooperate to maintain the male end of the second pipe section inside the female end of the first pipe section.

The present disclosure is also directed to a method of joining a first pipe section and a second pipe section. The method includes employing the pipe union assembly to secure the first and second pipe sections together.

DETAILED DESCRIPTION OF THE DISCLOSURE

Figure 1A:
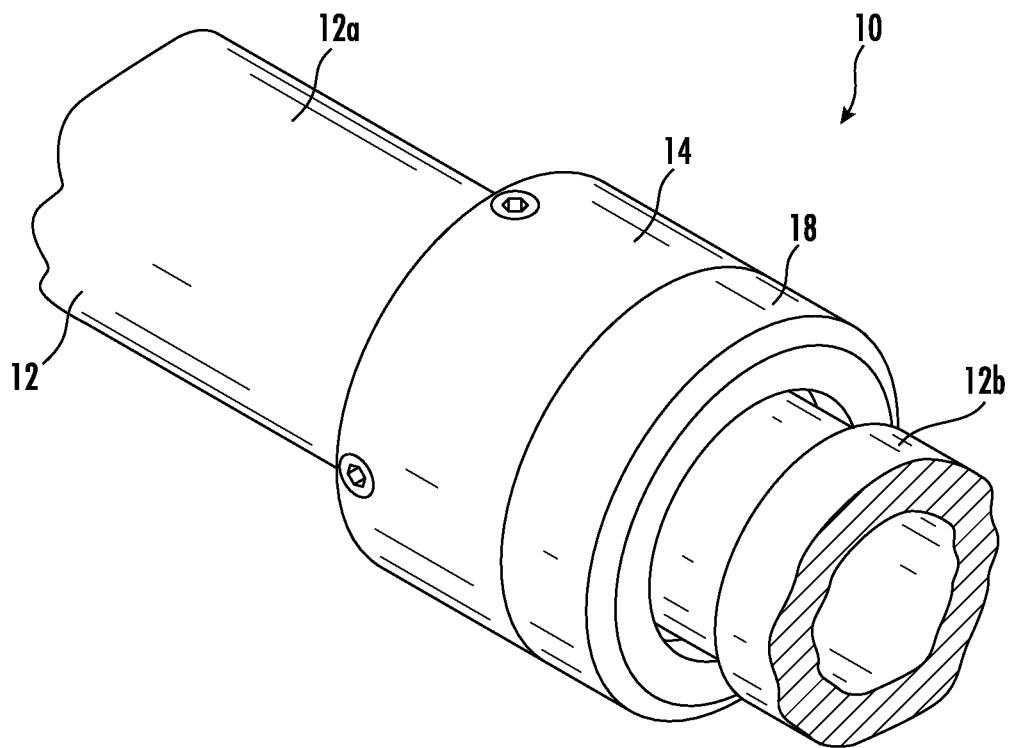
FIGS. 1A and 1B are perspective views of a pipe union assembly constructed in accordance with the present disclosure.
Figure 1B:
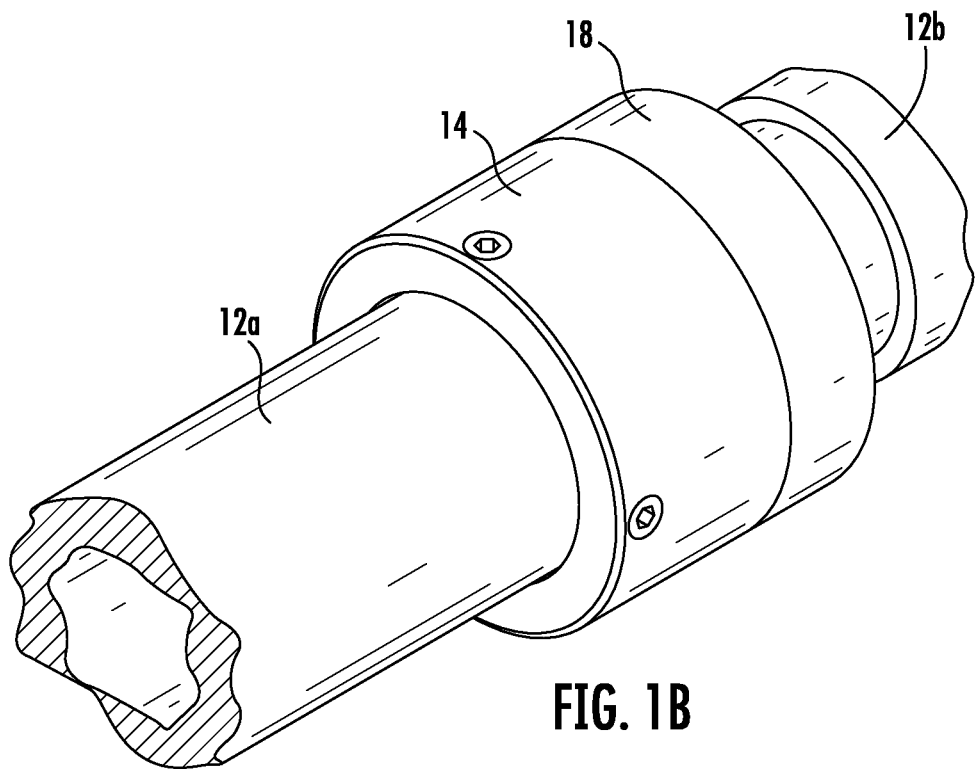
Figure 2A:
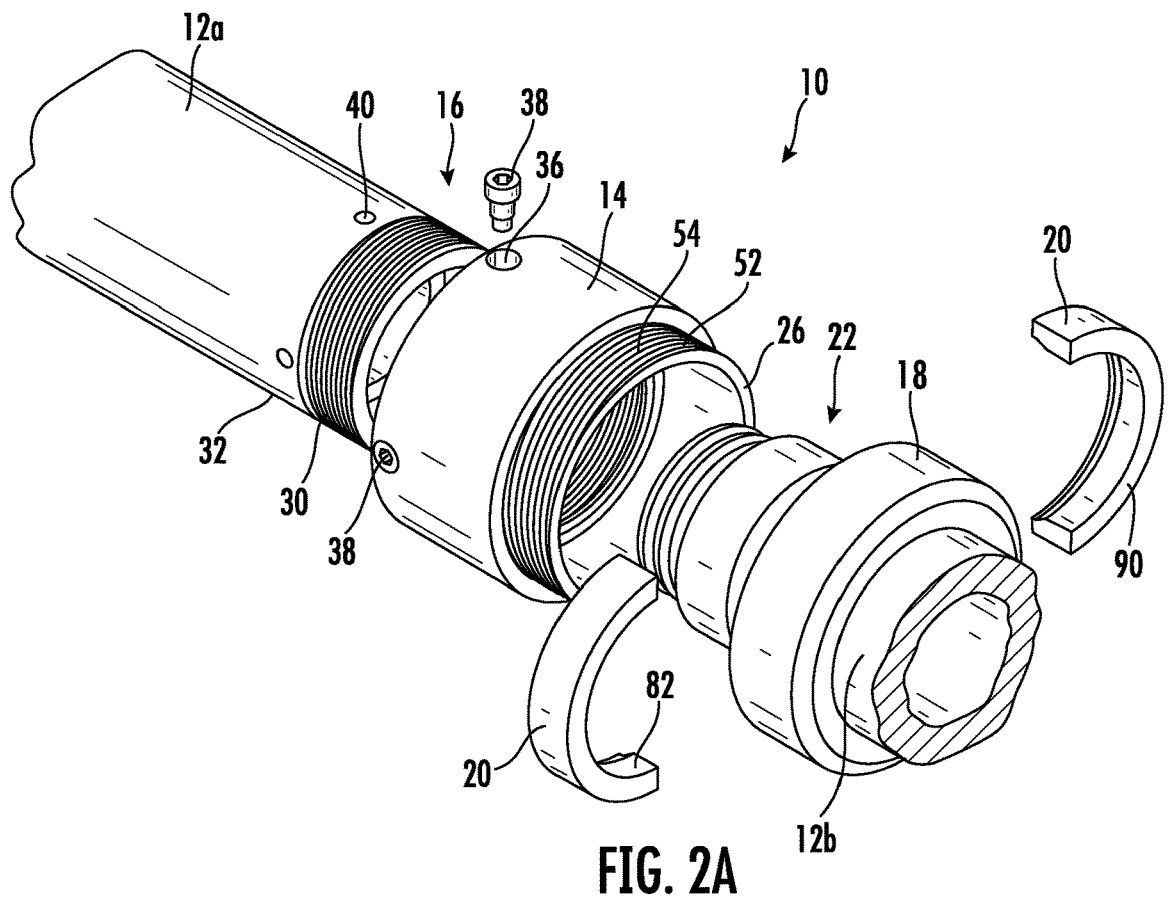
FIG. 2A is an exploded, perspective view of the pipe union assembly constructed in accordance with the present disclosure.
Figure 2B:
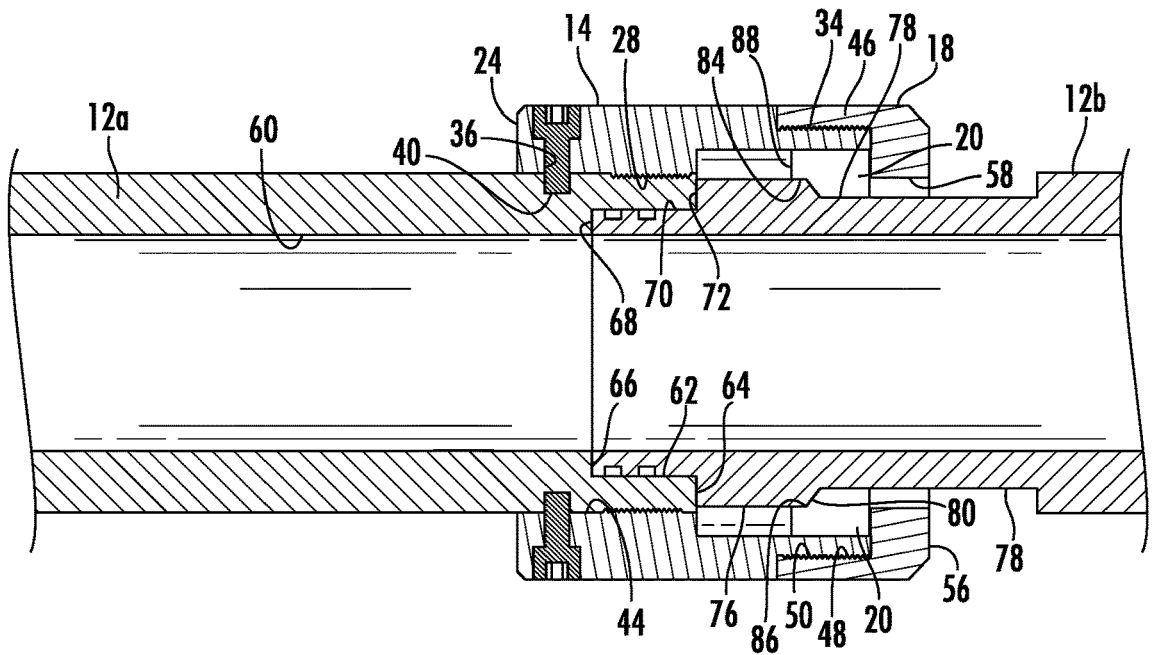
FIG. 2B is a cross-sectional view of the pipe union assembly constructed in accordance with the present disclosure.

Referring now to FIGS. 1A-2B, the present disclosure relates to a pipe union assembly 10 for coupling two sections of pipe 12 together. The design of the pipe union assembly 10 disclosed herein provides many benefits. There are less parts in the pipe union assembly 10, which permits material for more unions and other equipment to be hauled on a truck. The pipe union assembly 10 design allows for repairs to be made without the need for welding and stress relieving and reduces the time needed to connect to sections of pipe 12. The pipe union assembly 10 includes a quick union nut 14 securable to a female end 16 of a first pipe section 12a, a retainer collar 18 securable to the quick union nut 14, and a segmented load ring 20 disposable around a portion of a male end 22 of a second pipe section 12b.

The quick union nut 14 can have a first end 24 and a second end 26. The first end 24 having threads 28 on the inside that engage threads 30 disposed on the outside 32 of the female end 16 of the first pipe section 12a. The second end 26 of the quick union nut 14 can have threads disposed on the outside to engage with the retainer collar 18. The inner diameter of the second end 26 of the quick union nut 14 can be larger than the outer diameter of the male end 22 of the second section of pipe 12b to permit the segmented load ring 20 to be disposed between the second end 26 of the quick union nut 14 and the male end 22 of the second section of pipe 12b.

In another embodiment of the present disclosure, the first end 24 of the quick union nut 14 can have radial directed holes 36 (threaded or unthreaded) that permit screws 38 to extend therethrough and engage threaded depressions 40 (or holes that do not extend all the way through) disposed in the female end 16 of the first pipe section 12a. In another embodiment, the female end 16 of the of the first pipe section 12a can include a circumferential groove (not shown) disposed therein that the screws 38 can engage to prevent axial movement of the quick union nut 14. The screws 38, when engaged with the depressions 40 or groove in the female end 16 of the first pipe section 12a, prevent the quick union nut 14 from rotating and coming loose from the first pipe section 12a. In a further embodiment, the first end 24 of the quick union nut 14 can have a threadless portion 44 that extends beyond the threads 28 on the inside of the quick union nut 14 that the radial directed holes 36 extend through, and the depressions 40 in the female end 16 of the first pipe section 12a are disposed in a part of the first pipe section 12a that does not have threads. In yet another embodiment of the present disclosure, the radial directed holes 36 and the depressions 40 or groove in the female end 16 of the first pipe section 12a are placed such that when the quick union nut 14 is threaded a certain amount onto the first pipe section 12a, the radial directed holes 36 in the first end 24 of the quick union nut 14 and the depressions 40 or groove in the female end 16 of the first pipe section 12a are in alignment, which allows the screws 38 to extend through the first end 24 of the quick union nut 14 and engage the threaded depressions 40 or groove in the female end 16 of the first pipe section 12a.

The retainer collar 18 can have a first end 46 with threads 48 disposed on an inside portion 50 to engage the threads 52 on the outer portion 54 of the second end 26 of the quick union nut 14 and a flanged second end 56 that extends radially inward towards the male end 22 of the second pipe section 12b and engages with a part of the segmented load ring 20. The terminal end 58 of the flanged second end 56 of the retainer collar 18 has an inner diameter that is sized such that the retainer collar 18 can be slid onto the male end 22 of the second pipe section 12b. The retainer collar 18 is not securely attached directly to the male end 22 of the second pipe section 12b.

The geometry of the female end 16 of the first pipe section 12a and the male end 22 of the second pipe section 12b can have some unique geometries. In one embodiment, the female end 16 of the first pipe section 12a can have a first inner diameter 60 that is essentially the same as the inner diameter of the male end 22 of the second pipe section 12b. The female end 16 of the first pipe section 12a can have a second inner diameter 62 that extends from a terminal end 64 of the first pipe section 12a to a shoulder 66. The shoulder 66 is where the first inner diameter 60 of the female end 16 of the first pipe section 12a transitions to the second inner diameter 62 of the female end 16 of the first pipe section 12a and one area where a terminal end 68 of the male end 22 of the second pipe section 12b engages the female end 16 of the first pipe section 12a.

The male end 22 of the second pipe section 12b can have a first outer diameter 70 that is designed to fit inside the second inner diameter 62 section of the female end 16 of the first pipe section 12a and extends from the terminal end 68 of the male end 22 of the second pipe section 12b to a shoulder 72. The shoulder 72 of the male end 22 of the second pipe section 12b is where the terminal end 64 of the first pipe section 12a can abut. The shoulder 68 of the male end 22 of the second pipe section 12b also provides a transition area to a second outer diameter 76 of the male end 22 of the second pipe section 12b. The male end 22 of the second pipe section 12b can also have a third outer diameter 78 and an angled portion 80 that transitions from the second outer diameter 76 to the third outer diameter 78. The angled portion 80 transitions from a larger diameter for the second outer diameter 76, to a smaller diameter for the third outer diameter 78. The terminal end 58 of the retainer collar 18 has an inner diameter that is large enough to pass over the second outer diameter 76 of the male end 22 of the second pipe section 12b.

The segmented load ring 20 can be made of at least two parts to permit the segmented load ring 20 to be able to be radially disposed at least partially between the third inner diameter 78 section of the male end 22 of the second pipe section 12b and the second end 26 of the quick union nut 14. The segmented load ring 20 can have a first inner diameter 82 that engages with the third outer diameter section 78 of the male end 22 of the second pipe section 12b and a second inner diameter 84 that engages with the second outer diameter section 76 of the male end 22 of the second pipe section 12b. The segmented load ring 20 has a slanted section 86 where the inner diameter of the segmented load ring 20 transitions from the first inner diameter 82 to the second inner diameter 84. The segmented load ring 20 can have a first axial side 88 and a second axial side 90. The first axial side 88 terminates between the second end 26 of the quick union nut 14 and the second outer diameter section 76 of the male end 22 of the second pipe section 12b. The second axial side 90 engages the flanged second end 56 of the retainer collar 18. When the retainer collar 18 is tightened on the second end 26 of the quick union nut 14, the slanted section 86 of the segmented load ring 20 engages the angled portion 80 of the male end 22 of the second pipe section 12b. As the retainer collar 18 is further tightened, the slanted section 86 and the angled portion 80 force the segmented load ring 20 outward in a radial direction, which causes the threaded engagement between the retainer collar 18 and the quick union nut 14 to be further secured.

Figure 3A:
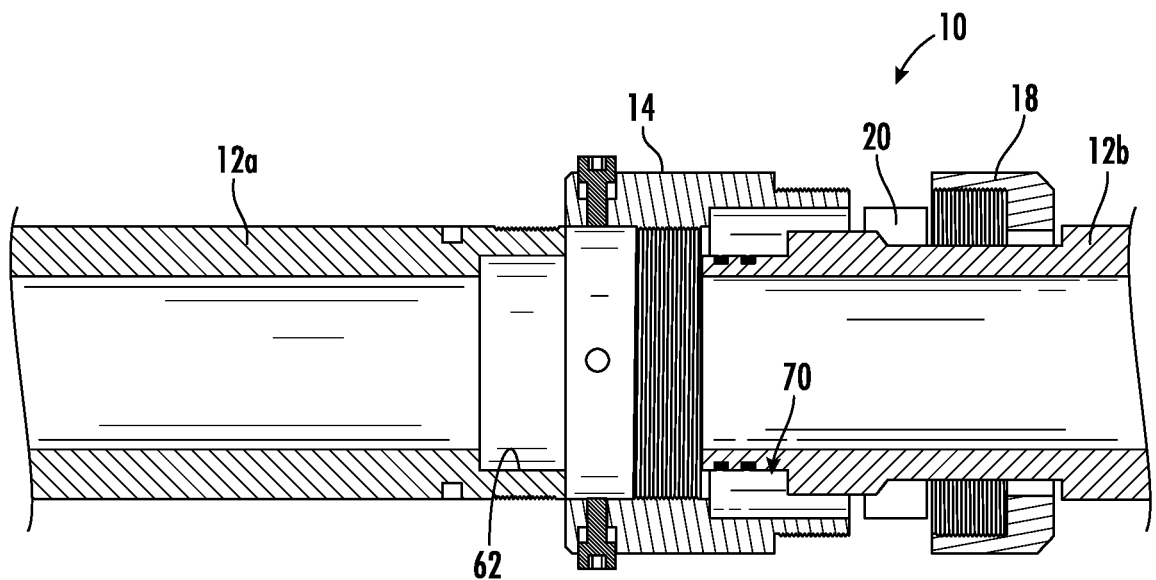
FIG. 3A is a cross-sectional view of the pipe union assembly constructed in accordance with the present disclosure.
Figure 3B:
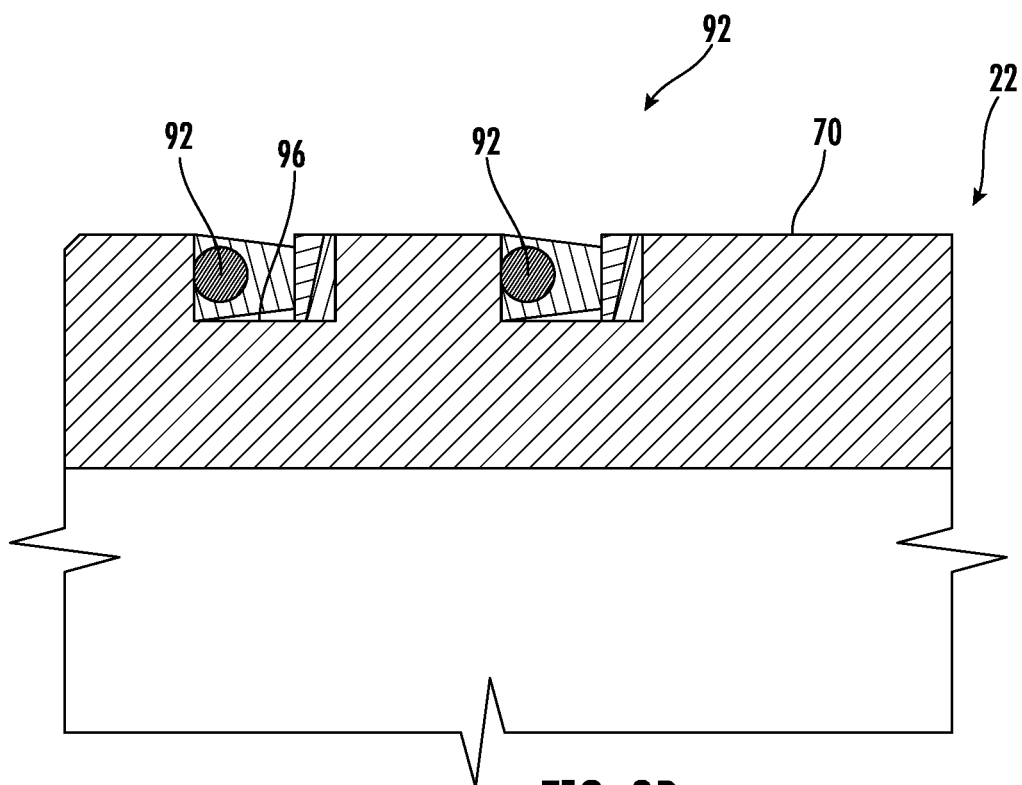
FIG. 3B is a cross-sectional view of a portion of the pipe union assembly shown in FIG. 3A constructed in accordance with the present disclosure.
Figure 4A:
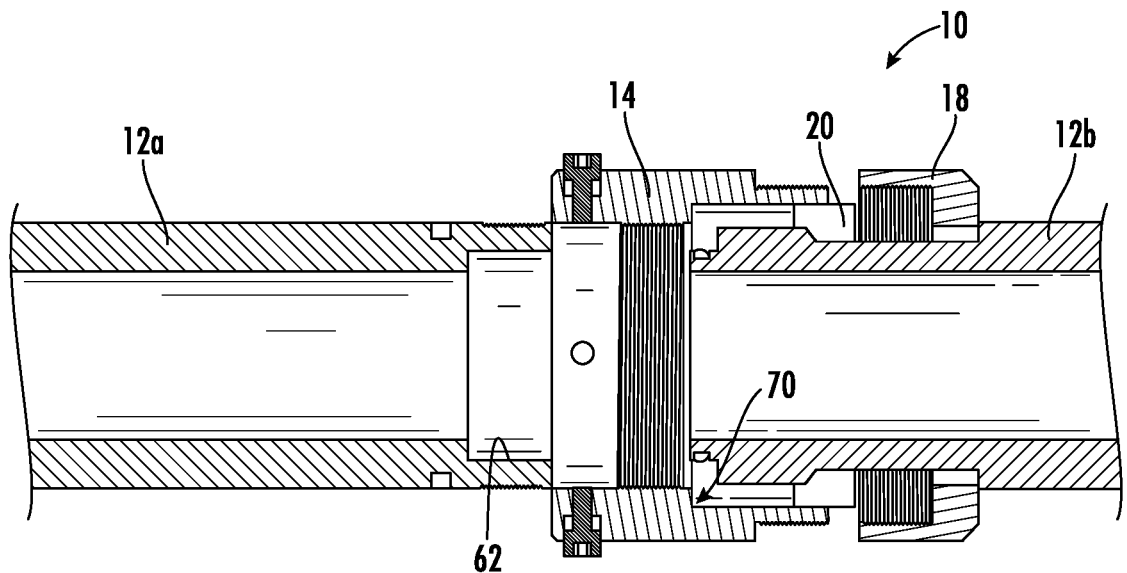
FIG. 4A is a cross-sectional view of another embodiment of a pipe union assembly constructed in accordance with the present disclosure.
Figure 4B:
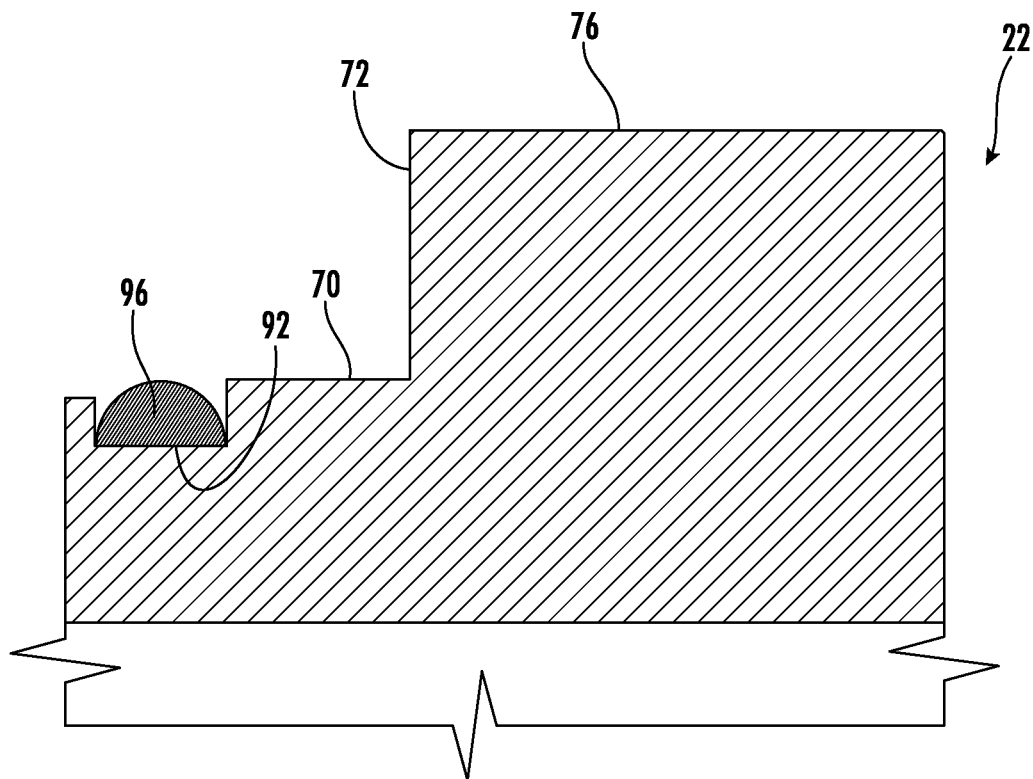
FIG. 4B is a cross-sectional view of a portion of the pipe union assembly shown in FIG. 4A constructed in accordance with the present disclosure.

The pipe union assembly 10 can also include a sealing mechanism 92 between the female end 16 of the first pipe section 12a and the male end 22 of the second pipe section 12b. In one embodiment shown in FIGS. 4A and 4B, the sealing mechanism 92 can be at least one sealing member 94 disposed circumferentially around, or embedded in, the first outer diameter section 70 of the male end 22 of the second pipe section 12b that is inserted into the female end 16 of the first pipe section 12a. In another embodiment shown in FIGS. 3A and 3B, the male end 22 of the second pipe section 12b can have a fourth outer diameter section 96 that is immediately adjacent to the terminal end 68 of the male end 22 of the second pipe section 12b. In this embodiment, the sealing member 94 can be disposed circumferentially around the fourth outer diameter section 96 of the male end 22 of the second pipe section 12b.

The present disclosure is also directed to a method of joining two sections of pipe using the pipe union assembly 10 described herein. More specifically, the pipe union assembly 10 can be used to join the female end 16 of a first pipe section 12a and the second pipe section 12b. The quick union nut 14 can be threaded onto the female end 16 of the first pipe section 12a. The retainer collar 18 can be disposed around the male end 22 of the second pipe section 12b and the male end 22 of the second pipe section 12b can begin to be inserted into the female end 16 of the first pipe section 12a. The segmented load ring 20 can be disposed around the male end 22 of the second pipe section 12b and inside the quick union nut 14. The retainer collar 18 can then be threaded onto the quick union nut 14 to secure the pipe sections 12a and 12b together.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:
1. A pipe union assembly, the pipe union assembly comprising:
 a female end of a first pipe section and a male end of a second pipe section, the male end of the second pipe section includes an angled portion where the outside diameter of the male end of the second pipe section is reduced;

a quick union nut securable to the female end;

a retainer collar threadably secured to the quick union nut;

a segmented load ring disposed between the male end of the second pipe section and the quick union nut, the segmented load ring has a slanted section disposed on an inside portion that engages with the angled portion of the male end of the second pipe section; and wherein the quick union nut, the retainer collar and the segmented load ring cooperate to maintain the male end of the second pipe section inside the female end of the first pipe section.

2. The pipe union assembly of claim 1 wherein the segmented load ring is made up of multiple parts.

3. The pipe union assembly of claim 1 wherein the segmented load ring is made of two parts.

4. The pipe union assembly of claim 1 wherein the quick union nut is threadably secured to the female end of the first pipe section and the quick union nut is threadably secured to the retainer collar when the pipe sections are secured together.

5. The pipe union assembly of claim 1 wherein the male end of the first pipe section includes a first diameter section, a second diameter section and a third diameter section wherein an inner diameter of the segmented load ring is smaller than the first and third diameter sections of the male end of the first pipe section.

6. The pipe union assembly of claim 5 wherein the retainer collar only contacts the quick union nut and the segmented load ring.

7. The pipe union assembly of claim 1 further comprising at least two sealing members disposed between the female end of the first pipe section and the male end of the second pipe section.

8. A method of joining a first pipe section and a second pipe section, the method comprising:

employing a pipe union assembly to secure the first and second pipe sections together, the pipe union assembly comprising:

a female end of a first pipe section and a male end of a second pipe section, the male end of the second pipe section includes an angled portion where the outside diameter of the male end of the second pipe section is reduced;

a quick union nut securable to the female end;

a retainer collar threadably secured to the quick union nut;

a segmented load ring disposed between the male end of the second pipe section and the quick union nut, the segmented load ring has a slanted section disposed on an inside portion that engages with the angled portion of the male end of the second pipe section; and wherein the quick union nut, the retainer collar and the segmented load ring cooperate to maintain the male end of the second pipe section inside the female end of the first pipe section.

9. The method of claim 8 further comprising:

securing the quick union nut to the female end of the first pipe section;

positioning the retainer collar over the male end of the second pipe section;

positioning the segmented load ring around male end of the second pipe section and inside a part of the quick union nut; and securing the retainer collar to the quick union nut.

10. The method of claim 8 wherein the segmented load ring is made up of multiple parts.

11. The method of claim 8 wherein the segmented load ring is made of two parts.

12. The method of claim 8 wherein the quick union nut is threadably secured to the female end of the first pipe section and the quick union nut is threadably secured to the retainer collar when the pipe sections are secured together.

13. The method of claim 8 wherein the male end of the first pipe section includes a first diameter section, a second diameter section and a third diameter section wherein an inner diameter of the segmented load ring is smaller than the first and third diameter sections of the male end of the first pipe section.

14. The method of claim 8 wherein the pipe union assembly further comprises at least two sealing members disposed between the female end of the first pipe section and the male end of the second pipe section.

* * * * *